United States Patent [19]
Custer

[11] Patent Number: 4,858,647
[45] Date of Patent: Aug. 22, 1989

[54] ATTITUDE-INSENSITIVE, BY-PASS SENSOR

[75] Inventor: Craig S. Custer, Pompano Beach, Fla.

[73] Assignee: Chem Tech Equipment Corp., Deerfield Beach, Fla.

[21] Appl. No.: 37,813

[22] Filed: Apr. 13, 1987

[51] Int. Cl.⁴ .......................... G01F 5/00; H01H 35/40
[52] U.S. Cl. .................................... 137/599.1; 73/202; 73/203; 116/267; 200/81.9 M
[58] Field of Search ............ 137/117, 110, 501, 513.7, 137/557, 528, 554, 599.1, 599; 251/65, 117; 73/203, 202, 861.71; 116/267; 200/81.9 M

[56] References Cited

U.S. PATENT DOCUMENTS

| | | | |
|---|---|---|---|
| 2,558,687 | 6/1951 | Krueger | 137/513.7 |
| 2,667,895 | 2/1954 | Pool et al. | 137/528 |
| 3,200,214 | 8/1965 | Aubert | 137/528 X |
| 3,546,405 | 12/1970 | Carignan | 137/557 X |
| 3,896,280 | 7/1975 | Blake | 137/554 |
| 4,122,863 | 10/1978 | Braukmann | 137/557 |
| 4,210,174 | 7/1980 | Eross | 251/65 |
| 4,603,707 | 8/1986 | Gregoire et al. | 137/554 X |

Primary Examiner—Stephen Hepperle
Attorney, Agent, or Firm—M. K. Silverman

[57] ABSTRACT

Disclosed is a valve having a body having an inlet channel, an outlet channel in fluid communication with the inlet channel, and a flow-monitoring region situated medially between the inlet and outlet channels. Further provided within the body is a secondary channel having a first end and a second end, the first end in fluid communication with the inlet side of the flow-monitoring region and the second end extending to the outside of the body. The first end of the secondary channel is provided with an area of constriction proximal to the inlet side of the flow-monitoring region. Within the secondary channel is a piston slideably moveably situated. The piston is a pole magnet having a magnetic axis substantially co-linear with the axis of the secondary channel. The diameter of the piston is greater than the diameter of the constriction. Secured within the second end of the secondary channel is a plug. This plug is a pole magnet having a magnetic axis in alignment with the axis of the secondary channel. The polarity of the magnetic axis is opposite to the polarity of the magnetic axis of the piston, thereby causing magnetic repulsion between the plug and the piston in the direction of the first end of the secondary channel and of the constriction of the secondary channel. Further provided is a by-pass channel having an upper end and a lower end, the upper end in fluid communication with the secondary channel in an area above the location of the piston and below the location of the plug. The lower end of the by-pass channel is in fluid communication with the outlet side of the flow-monitoring region.

1 Claim, 2 Drawing Sheets

ATTITUDE-INSENSITIVE, BY-PASS SENSOR

BACKGROUND OF THE INVENTION

The present invention relates broadly to sensors for the monitoring of flow rates or flow conditions within pressurized fluid channels and, more particularly, to the limitation of flow valves when the flow rate exceeds a given level at a particular location within the pressurized channel.

Flow rate and flow condition limit valves are commonly employed as safety devices in pressurized fluid distribution systems to isolate fluid sources from any ruptures or breaches, thereby minimizing the loss of pressurized fluid. Safety-designed fluid transport systems using pressurized gases or liquids that are toxic, corrosive, radioactive, or explosive, employ flow limit valves to minimize exposure to these hazardous elements in the event of an accident or other undesirable event.

Flow limit valves allow fluid flow up to a predetermined limiting flow rate; the flow rate is determined by the difference between the upstream (inlet) supply pressure and the downstream (outlet) pressure. During normal operation, the pressure differential across the valve establishes a flow rate of the valve that is less than or equal to the limiting flow rate. A rupture in the downstream distribution system will cause a reduction in the downstream pressure and, hence, an increase of pressure differential across the valve. This increased pressure differential corresponds to a flow rate through the valve that may exceed the limiting flow rate.

To limit the flow rate through the valve to a predetermined limit, there has, in the prior art, been employed a piston, or similar device, which provides blockage of the flow path when the pressure differential exceeds that corresponding to the limiting flow rate. During this condition, all flow through the valve is blocked while the pressure differential is lowered to repair the rupture, thereby permitting the piston to be re-set to its original position.

As an alternative to complete blockage of the valve to limit flow rate, there may be provided, as in the below-set forth disclosure, a by-pass channel the effect of which is to reduce the flow rate below the limit value.

A typical prior art flow limit valve includes a primary flow path, through an orifice from an inlet port, to an outlet port. A movable piston is provided to close the primary flow path when the pressure differential across the orifice exceeds a certain value. Fluid from the inlet and outlet sides of the orifice is ported to opposite sides of the piston. The outlet pressure, assisted by a spring, tends to move the piston to an open position, which permits fluid to flow through the valve, and the inlet pressure tends to move the piston to a closed position, which prevents fluid flow. The spring and the piston are designed such that any pressure differential greater than the pressure differential that corresponds to the limiting flow rate, allows the inlet pressure to overcome the outlet pressure and the spring force to move the piston to the closed position. To reset this flow limit valve, a bypass valve is opened, and fluid flows through a secondary flow path to equalize the pressure on each side of the piston, thereby allowing the spring to move the piston to the open position.

Certain known valves use a third flow path with an integrated valve to bypass the shut-off piston for providing adjustment of the flow limit. Flow limit valves of these types are expensive to manufacture and difficult to purge due to the multiple flow paths and bypass valves involved. Also, the flow rate through a flow limit valve should be proportional to the pressure differential up to the limiting value of the flow rate, and should sharply fall to zero when the limiting valve is exceeded. However, spring-biased flow limit valves allow a flow rate that is proportional to the pressure differential up to the point where the piston begins to compress the spring and to move from the open position to the closed position, but does not provide a sharp closure because of the additional pressure differential necessary to further compress the spring and complete the movement of the piston from the open position to the closed position.

The instant invention seeks to overcome the above-set forth problems in the prior art through the use of repelling magnets in lieu of springs and, as well, an externally adjustable member by which the degree of magnetic repulsion and, thereby, the flow limit levels of the valve may be sensed and then adjusted.

Prior art references known to the inventor in the subject art area are U.S. Pat. Nos. 4,210,174 (1980) to Eross entitled Positive Pressure Valves; and No. 4,624,443 (1986) to Eidsmore entitled Fluid Flow Control Valve.

The above-recited reference to Eross is not a sensor; although magnetic means are provided, it is intended only to control and monitor pressure levels, not flow levels, this being a particularly important distinction in the instant art area. The patent to Eidsmore employs springs in combination with a complex structure of magnets and, as well, does not provide a by-pass capability. Further, its primary concern is that of monitoring pressure drops, not flow rate changes as is the concern of the inventor herein.

SUMMARY OF THE INVENTION

The invention relates to an attitude-insensitive by-pass sensor for the monitoring of flow rates by the actuation of an armature when a flow limit rate is attained.

The inventive valve comprises a body having an inlet channel, an outlet channel in fluid communication with the inlet channel, and a flow-monitoring region situated medially between said inlet and outlet channels. Further provided within said body is a secondary channel having a first end and a second end, said first end in fluid communication with the inlet side of said flow-monitoring region and said second end extending to the outside of said body. Said first end of said secondary channel is provided with an area of constriction proximal to said inlet side of said flow-monitoring region.

Within said secondary channel is a piston slideably moveably situated therein. Said piston is a pole magnet having a magnetic axis substantially co-linear with the axis of said secondary channel. The diameter of said piston is greater than the diameter of said constriction.

Secured within said second end of said secondary channel is a plug. Said plug comprises a pole magnet having a magnetic axis in alignment with the axis of said secondary channel. The polarity of said magnetic axis is opposite to the polarity of the magnetic axis of said piston, thereby causing magnetic repulsion between said plug and said piston in the direction of said first end of said secondary channel and of said constriction of said secondary channel.

Further provided is a by-pass channel having an upper end and a lower end, said upper end in fluid communication with said secondary channel in an area above the location of said piston and below the location of said plug. The lower end of said by-pass channel is in fluid communication with the outlet side of said flow-monitoring region.

When the flow rate across said flow-monitoring region exceeds the limiting flow rate, the pressure against the end of said piston in abutment with said constriction will be sufficient to overcome the magnetic repulsion between the piston and said plug, thereby causing a displacement of said piston in the direction of said plug. This displacement will enable fluid at the inlet side of said flow-monitoring region to pass about the annular clearance between said piston and the internal diameter of said secondary channel and, therefrom, into said by-pass channel and, therefrom, to the outlet side of said flow-monitoring region. When the flow rate decreases below the limiting flow rate, the piston will again drop to its normally closed position. If the flow rate in the flow-monitoring region remains above the limiting flow rate, the piston will remain open thereby permitting flow simultaneously thru the by-pass channel and the flow-monitoring region.

Another object is to provide a flow limit valve in which the limiting flow rate may be externally adjusted.

A further object of the present invention is to provide a flow limit valve which is attitude-insensitive.

The above and other objects and advantages of the present invention will become apparent from the hereinafter set forth Detailed Description of the Invention, the Claims, and the Drawings appended herewith.

DETAILED DESCRIPTION OF THE DRAWINGS

DETAILED DESCRIPTION OF THE INVENTION

Figure 1:
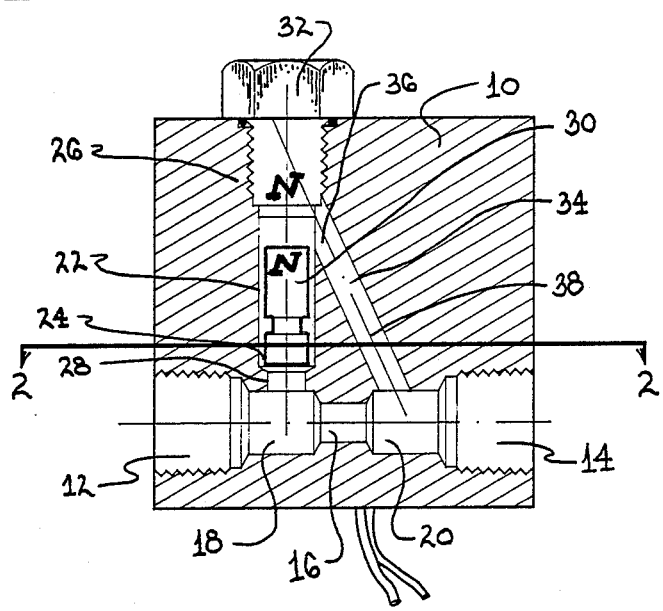
FIG. 1 is a cross-sectional longitudinal view of the instant invention.

In reference to FIG. 1, there is shown in longitudinal, cross-sectional view, the inventive excess flow condition by-pass valve. In particular, there is shown a body 10 having an inlet channel 12 and outlet channel 14 which are in fluid communication with each other. Medially disposed between said inlet channel 12 and said outlet channel 14 is a flow-monitoring region 16 having an inlet side 18 and an outlet side 20.

Further provided within the valve body is secondary channel 22 having a first end 24 and a second end 26. As may be noted from FIG. 1, said first end 24 is in fluid communication with the inlet side 18 of flow-monitoring region 16 thru constriction 28. Said second end 26 of secondry channel 20 extends to the outside of said body 10. However, said second end 26 will normally be filled by plug 32 which, through thread means, is rotatably secured within said second end 26.

Figure 2:
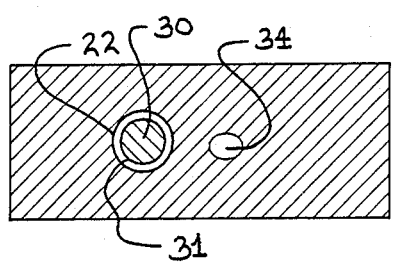
FIG. 2 is a radial cross-sectional view taken along Line 2—2 of FIG. 1.
Figure 3:
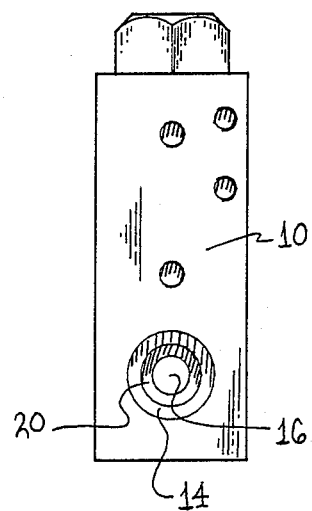
FIG. 3 is end plan view of the valve body shown in FIG. 1.

Further shown in said FIG. 1 is piston 30 which is slideably mounted within said secondary channel 22. As may be noted in FIG. 2, piston 30 does not cover the complete diametric cross-section of secondary channel 22. Accordingly, an annular region 31 is left between piston 30 and the internal diameter of secondary channel 22.

Both said piston 30 and said plug 32 are provided with magnetic axes such that a repulsion between said plug and said piston will exist. This is indicated by the letters "N" at the bases of piston 30 and plug 32. By virtue of this repulsion of piston 30 and plug 32, piston 30 will normally be pressed into a downward position against constriction 28. Thereby, when piston 30 is in its typical operating condition, its lower face will be seated at first end 24 of secondary channel 22 and thereby seated against constriction 28.

Body 10 is further provided with a by-pass channel 34 having an upper end 36 and a lower end 38. Said upper end is in fluid communication with that area of secondary channel 22 below plug 32 and above magnet 30 when the magnet is in its normally down position, in abutment with constriction 28.

It is to be noted that the plug 32 may be rotationally advanced upward or downward to modify the degree of repulsion between the opposing "N" faces of said plug and said piston. Thereby, the actuation point of piston 30 may be calibrated. In addition, it is to be appreciated that the degree of repulsion between piston 30 and plug 32 must always exceed the force of gravity in order to insure that the present inventive plug will be attitude-insensitive that is, that piston 30 will function in a desired fashion regardless of the orientation of the valve body relative to the gravity vector.

A further advantageous feature in the design of plug 32 is that said plug may be completely removed to periodically effect the clean-out of all the channels and cavities in the valve body.

In operation, the effect of flow through flow-monitoring region 16 will be felt across constriction 28 according to the pressure differential between inlet channels 12 and 14. When the flow rate reaches a limiting factor, the pressure across constriction 28 will be sufficient to overcome the magnetic repulsion between piston 30 and plug 32, thereby effecting the upward movement of piston 30. Should a decrease in flow rate occur, piston 30 will again drop into its normal position against constriction 28. However, if the flow rate across flow-monitoring region 16 remains in excess of the limit flow rate, piston 30 will remain elevated.

The movement of piston 30 may be sensed through a variety of state-of-the-art external monitors including but not limited to reed switches, hall effect switches, fiber optic arrangements, and sonic sensing means.

In such sensors, the present inventive sensor may itself be used as an on-off switch in which a system may be actuated or de-actuated upon the flow rate across flow-monitoring region 16. Also, as above-noted, the present design is attitude-insensitive and, thereby, will be of value in many applications including aircraft and spacecraft.

Further, by virtue of the ability to calibrate the sensing flow rate through a simple rotation of plug 32, a high level of sensitivity in flow rate monitoring can be achieved.

Accordingly, while there have been shown and described the preferred embodiment of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

Having thus described my invention, what I claim as new, useful and non-obvious and, accordingly, secure by Letters Patent of the United States is:

1. An attitude-insensitive, flow rate sensing device for monitoring flow conditions, the sensor comprising:
  (a) a body having an inlet channel, an outlet channel in fluid communication with said inlet channel, and a flow-monitoring region situated medially between said inlet and outlet channels, said flow-monitoring region thus having an inlet side and an outlet side;
  (b) in said body, a secondary channel having a first end and a second end, said first end in fluid communication with said inlet side of said flow-monitoring region and said second end extending to the outside of said body, said secondary channel having at its first end an area of constriction relative to its diameter;
  (c) a piston slideably moveable within an annulus of the secondary channel, said piston having a diameter greater than the diameter of said constriction of said secondary channel, said piston further defining a pole magnet having a magnetic axis co-linear with the axis of said secondary channel;
  (d) a plug secured within said second end of said secondary channel, said plug defining a pole magnet having an axis co-linear with the axis of said secondary channel, said magnetic axis of said plug oriented oppositely to the polarity of the magnetic axis of said piston, thereby effecting a magnetic repulsion between said plug and said piston in the direction of said first end of said secondary channel; and
  (e) in said body, a by-pass channel having an upper end and a lower end, said upper end in fluid communication with said secondary channel at an area medially between said piston and said plug, said lower end of said by-pass channel in fluid communication with said outlet side of said flow-monitoring region, in which said plug secured within second end of said secondary channel comprises: said plug secured within said second end to thereby permit the selective advancement of said plug relative to said second end and thereby to be advanced for withdrawal of said plug relative to the location of said piston, selectively adjusting the degree of magnetic repulsion between said plug and said piston thusly calibrating the flow condition actuation point of said piston, whereby an excess flow condition within said flow-monitoring region will generate an enhanced fluid pressure against said constriction of said secondary channel and against the end of said piston in abutment therewith, sufficient to partially overcome the magnetic repulsion between said piston and said plug thereby causing the resultant displacement of said piston toward said plug, thereby permitting an increased level of fluid from said inlet channel to flow through said constriction and across said annulus between the surface of said piston and the inside diameter of said secondary channel and, therefrom, into said by-pass channel and to the outlet side of said flow-monitoring region and therefrom, out of the present attitude-insensitive sensor.

* * * * *